(12) United States Patent
Kanevsky et al.

(10) Patent No.: US 7,212,992 B1
(45) Date of Patent: May 1, 2007

(54) METHOD AND SYSTEM FOR TRACKING A DEPOSIT

(75) Inventors: Dimitri Kanevsky, Ossinning, NY (US); Wlodek W. Zadrozny, Tarrytown, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,073

(22) Filed: May 12, 2000

(51) Int. Cl.
*G06Q 40/00* (2006.01)
(52) U.S. Cl. .......................................... 705/35; 705/1
(58) Field of Classification Search ................ 235/380; 705/25–42
See application file for complete search history.

(56) References Cited

U.S. PATENT DOCUMENTS 5,696,366 A * 12/1997 Ziarno ...................... 235/380
5,878,416 A * 3/1999 Harris et al. ................. 707/10
5,884,298 A * 3/1999 Smith et al. .................. 707/2
5,887,273 A * 3/1999 Ziarno .......................... 705/39
5,909,794 A * 6/1999 Molbak et al. ............... 705/35
6,253,998 B1 * 7/2001 Ziarno ........................ 235/380

OTHER PUBLICATIONS

Walt, "Acknowledging the gift: The most important aspect of fund raising", Fund raising Management, Garden City: Feb. 2000, vol. 30, Iss. 12, p. 36.*

* cited by examiner

*Primary Examiner*—Frantzy Poinvil
(74) *Attorney, Agent, or Firm*—Rafael Perez-Pineiro, Esq.

(57) ABSTRACT

The present invention relates to tracking the use, transfer, impact and/or effect of a deposit. An index is correlated to a depositor making a deposit. The deposit, or portion thereof, and the index are transferred to one or more destinations. The deposit, or portion thereof, is used at the destination resulting in uses, impacts, effects or subsequent transfers. Information of each use, impact, effect or transfer is transferred with the index back to a central location for storage, referenced by the index. The information may be viewed by the depositor according to the index of the depositor. A reference number is placed on any end product produced by the use the deposit. A third party may view information about the depositor by using the reference number.

54 Claims, 5 Drawing Sheets

METHOD AND SYSTEM FOR TRACKING A DEPOSIT

BACKGROUND OF THE INVENTION

1. Filed of the invention

The invention relates to a method and system for tracking a deposit, and more particularly, to a method and system for tracking the location and impact of the deposit through time and space. One embodiment of the present invention utilizes a network connection such as the Internet as the means to accomplish the tracking.

2. Description of Related Art

Many forms of deposits exist today. Among them are monetary deposits into financial institutions, including banks, the stock market, investment companies, etc., wherein the depositor retains ownership of the deposit or its value. Other examples of deposits include donations made to charitable or not-for-profit organizations. Still yet another form of a deposit is one of a donation of human organs, blood, bone marrow or other human tissue. And yet a further example of a deposit is one of time, namely, hours spent volunteering for a particular charity or not-for-profit organization. In the last three types of deposits the depositor usually transfers ownership or at least a portion of the control of the deposit.

In any of these deposit situations, the depositor transfers the deposit to a particular destination. Thereafter the deposit is used at the destination for any number of purposes, for example, to generate further money through any type of various investments, to assist in a needed medical operation, to aid in medical or other types of research, or to fulfill any of a hundred other particular objectives or needs of the recipient of the deposit (i.e., the "destination"). In some instances the original deposit (in whole or in part) may be forwarded to a further destination for use at that location or even split and sent to several further destinations.

In the first type of deposit given above, the destination, for example an investment company, may use the deposit to purchase stock in a company, thereby increasing that company's working capital. The increase in capital may lead to the generation of new jobs. If used in a research project, it also may lead to the development of inventions or products that greatly benefit society.

The second type of deposit the charitable donation of money, for example, may be used to buy food for an impoverished family. It could be used to buy clothing for abandoned babies. Or it may be used to pay the rent of a homeless shelter. A charitable donation may alternatively be in the form of property, stocks, real estate, clothing, food and shelter. These types of deposits may be directed at other not-for-profit organizations, such as entities involved in recycling programs or saving the rain forest.

The third type of deposit given above is another form of donation-type deposit. A human tissue deposit, for example, may be used directly in a medical procedure to save a person's life. It may also be used in research to develop new medical techniques, new medications or any other life enhancing procedure or product.

Finally, another example of a deposit noted above is a person volunteering his or her time in the form of labor. The time a person "deposits" with an organization, for example by making sandwiches for the homeless or mailing out donation requests, may result in feeding several families or raising a sum of money for the family. The money raised may in turn go to a home for run-away children.

One method of choosing where a deposit goes and allowing a donor to make a donation and have it earmarked for a specific purpose is known in a not-for-profit donation context. "The Yellowstone Wolf Tracker," for example, is an organization that allows a donor to donate money to help save the wildlife in Yellowstone National Park. The donor is asked if he or she would like their donation to be used for any one of a list of particular purposes. If the donor selects a particular purpose offered, the money is earmarked and used for that purpose. An analogous financial deposit is a person earmarking a $500.00 deposit into one of a number of mutual fund accounts he or she maintains at a single financial institution.

Currently, methods and systems of deposit give the depositor only limited satisfaction in the deposit experience. The depositor may receive satisfaction from making the initial deposit, but the depositor has no way of tracking the impact the particular deposit has made in the world. All that the existing methods provide to the depositor is the knowledge of the initial destination of the deposit and, in the case of a method such as the Yellowstone Wolf Tracker, an ability to choose an initial destination from a number of choices. However, the depositor will never know any of the numerous subsequent or consequential benefits the deposit has made, for example the jobs that were created, the homeless sheltered or fed, the lives saved, or the safe haven provided to run-a ways.

In addition, third parties, who may include users, recipients, consumers, or beneficiaries of the deposit, directly or indirectly, have no way of knowing the identity of the depositor. For example, if a deposit resulted in the writing of a new medical reference manual, the person reading the manual has no way of knowing who donated funds to aid in the research and development of the manual.

Accordingly, a need exists for a method of tracking the impact and path of a deposit.

SUMMARY OF THE INVENTION

One object of the present invention is to provide a tracking system for deposits.

Another object of the present invention is to provide a depositor with the ability to track his or her deposit through the use of the Internet.

Yet another object of the present invention is to provide a system that identifies depositors to third parties, including recipients of the benefit of the deposit.

These and other objects are satisfied by the method of tracking a deposit of the present invention. A depositor transfers a deposit to an initial destination. An index (such as a tracking number) is associated with the deposit. The index is also correlated to the depositor. The destination provides the depositor with the ability to constrain the use of the deposit by any number of possible constraints. The destination then uses the deposit at its location, transfers the deposit to a subsequent destination for use, or splits the initial deposit and transfers one or more of the parts to any number of subsequent destinations. The one or more subsequent destinations may in turn transfer all or part of the deposit to yet another subsequent destination. In general, after a deposit to an initial destination, there may be one or more transfers of all or part of the deposit to a secondary destination, followed by one or more transfers of all or part of the deposit received by the secondary destinations to one or more third level destinations, etc. With each use or transfer of all or part of the deposit the index remains linked or correlated thereto.

In addition, the use of all or part of a deposit at either an initial or subsequent destination may have an effect or influence at one or more subsequent destinations, which may lead to secondary, tertiary, or lower level effects at yet subsequent destinations. The index is associated with each such effect of a use of the deposit, thus allowing the effect to also be tracked.

A database is maintained and the information of each use, effect or transfer (in general, an "impact" of the deposit) is stored therein, thus providing a trail that can be tracked. The database can be located at any of the various tiers of destinations or at one location. When the deposit is used, transferred, or creates an effect, each of the destinations where the impact is experienced relays the information (including the type of impact and the index) back to the entity that maintains the database, i.e. the systems operator. The systems operator provides the depositor with an impact statement. This impact statement lists the uses and transfers of the deposit. The impact statement can be a paper statement mailed to the depositor. The systems operator can also maintain the impact statement such that the depositor can view it via the Internet. Ultimately, the depositor can follow and track the uses and impacts of the deposit over time.

As the deposit is used an end product may be produced. The end product may be a material product, for example, a book or a car. The end product may also be a service, for example, planting a tree in front of the local library. A reference number is placed on any of the end products that the deposit contributed to producing. A third-party or recipient of such an end product can access information associated with this reference number in a database maintained by the systems operator. Other deposits and their reference numbers that contributed to the end product may also be referenced, thus giving additional or all of the deposit sources of an end product. The depositor can limit the amount and scope of the information provided as one of the constraints. One embodiment of the present invention would allow a third-party, such as a recipient of a benefit of a deposit, to access this information, e.g. at a web site maintained by the systems operator.

These and other objects, features and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF A PREFERRED EMBODIMENT

Figure 1:
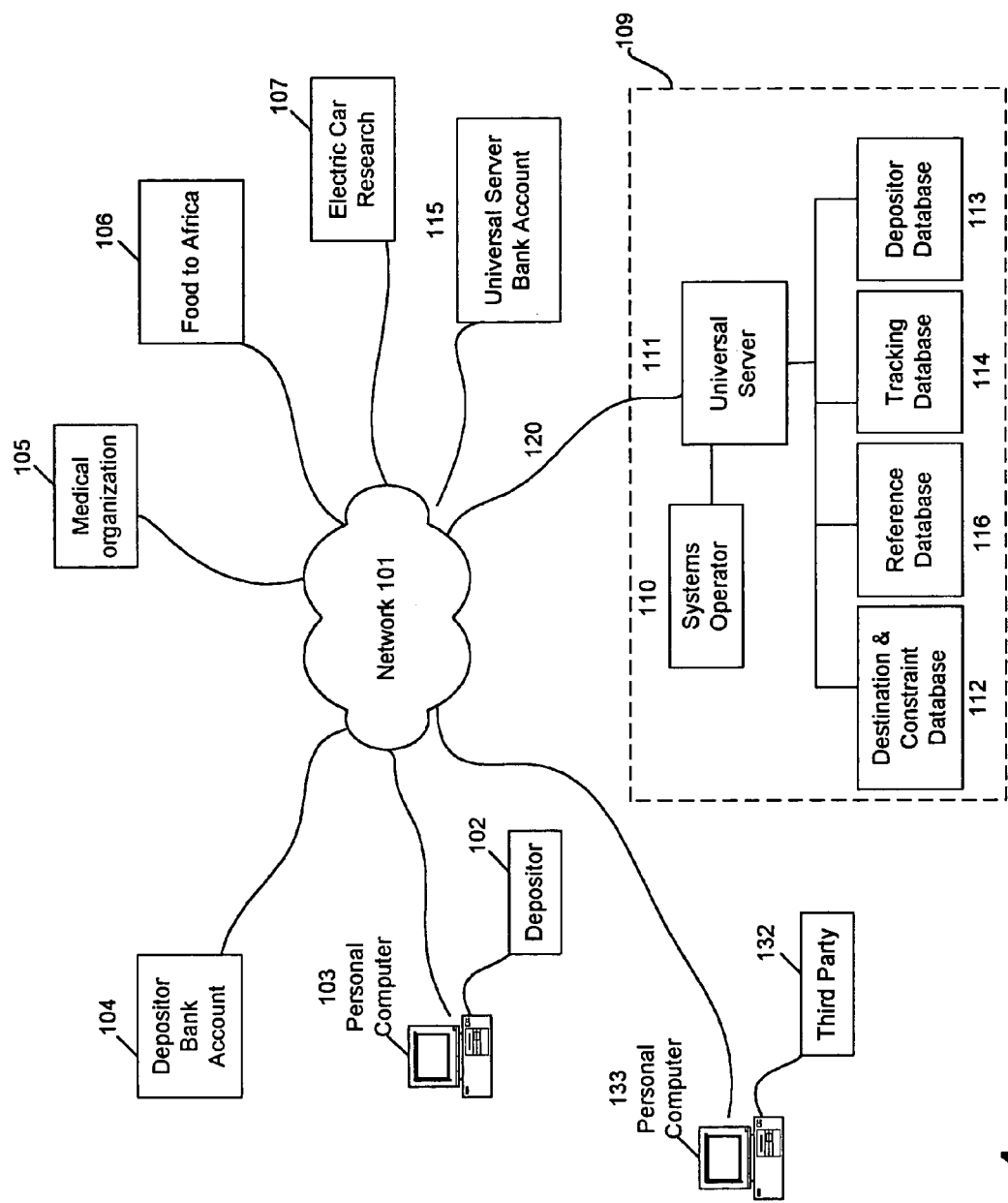
FIG. 1 is a block diagram of a distribution network for tracking deposits according to an embodiment of the present invention.

FIG. 1 is a block diagram of a distribution network for tracking deposits according to an embodiment of the present invention. A network 101 can be a local network or the Internet. Depositor 102 accesses the network 101 via a personal computer 103 and is connected through a network link 120 to a universal server 111 that is part of a system 109 that supports a preferred embodiment of the present invention. All communications between the depositor 102 and the system 109 (and between other components shown in FIG. 1) take place through network 101.

The universal server 111 queries whether the depositor wants to make a deposit and, if so, the depositor enters his personal information. This information is stored in a depositor database 113. The universal server 111 provides the depositor 102 with a list of destinations stored in a destination and constraint database 112 of the universal server 111, for example, a donation to a medical organization 105, a donation of food to Africa 106, or a donation to research the development of electric cars 107. The universal server 111 also provides the depositor 102 with various constraints contained in the destination and constraint database 112. These may, for example, give the depositor 102 the option to choose the length of time a deposit is to be tracked, to choose a disclosure level or setting regarding the depositor that sets the parameters that can be viewed by a third-party 132 through his personal computer 133, or the depth of the impact to be tracked (in other words, for how many subsequent destination levels the system should track the deposit and make the tracking data available to the depositor 102).

The depositor 102 enters an amount of an initial deposit, which is stored in the depositor database 113. The deposit can be directly withdrawn from a depositor bank account 104 owned by the depositor at a bank that provides network access to the finds, or it can be made using a credit card. Accordingly, credit card information would be requested. One embodiment of the present invention allows a depositor 102 to make a deposit from an automatic teller machine (ATM). The deposit would be transferred from the depositor bank account 104 to the universal server bank account 115.

The universal server 111 links or correlates an index, such as a tracking number, with the deposit and the depositor 102. A systems operator 110 maintains the system, including a tracking database 114. The systems operator 110 transfers the deposit (or portions thereof) and its associated index to the selected initial destination or destinations along with any pertinent constraints. The one or more destinations keep track of the uses and subsequent destinations of the deposit or portions thereof using the index. Subsequent destinations also keep track of the uses and any transfers to yet subsequent destinations. The destinations transfer back to the universal server 111 the tracking information, which is stored in the tracking database 114. The tracking information may include the various uses of the deposit at the various destinations, and the amount apportioned to that use. The depositor 102 at any time can access the universal server 111 and view the tracking information particular to his index.

In the case when a material end product is produced, for example a medical manual or an electric car, the product may include a reference number. The reference number is linked with the index and/or depositor information and stored in a reference database 116. A third-party 132 can access the universal server 111 and, by entering the reference number, view information about the depositor 102, subject to the disclosure level constraints chosen by the depositor 102.

Figure 2A:
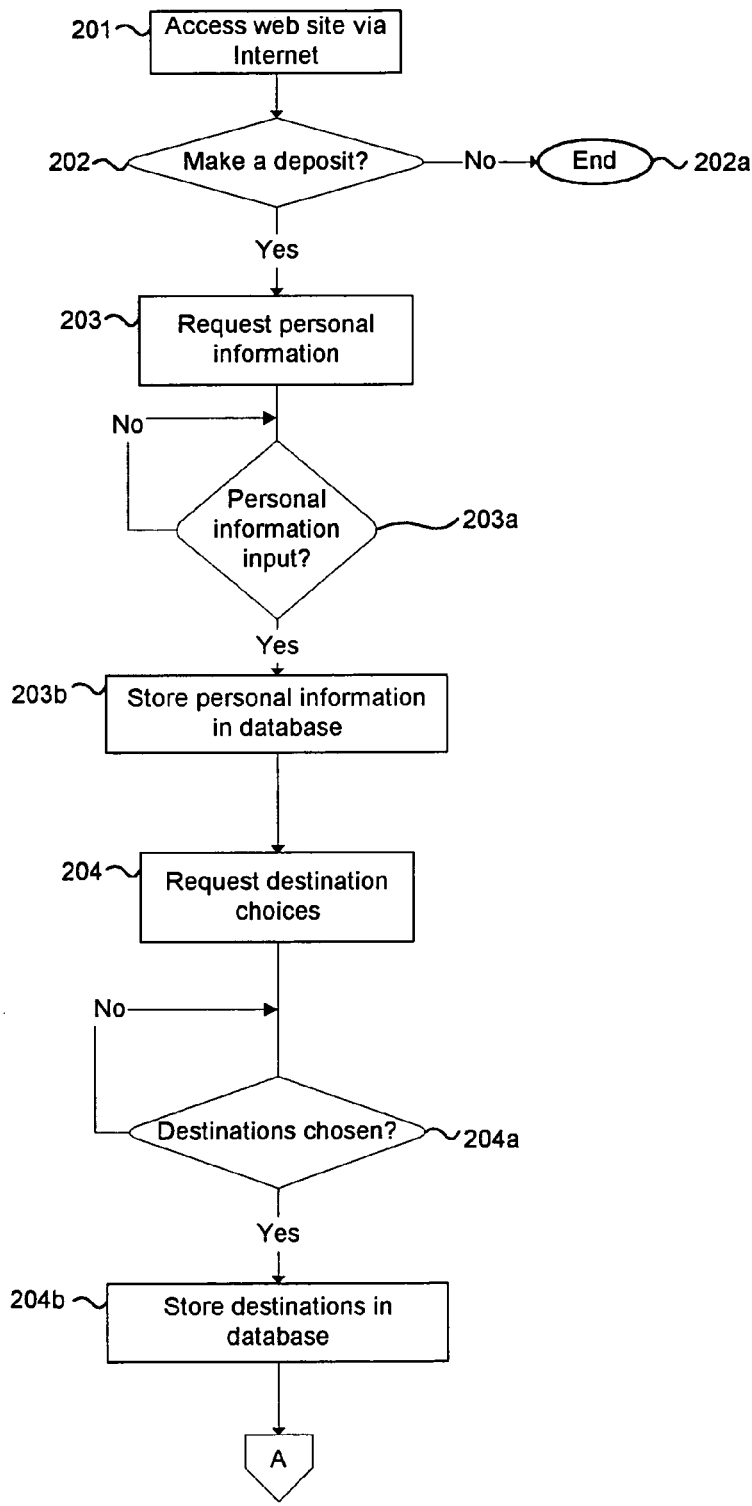
FIGS. 2a and 2b are a flow chart of the deposit process of an embodiment of the present invention.
Figure 2B:
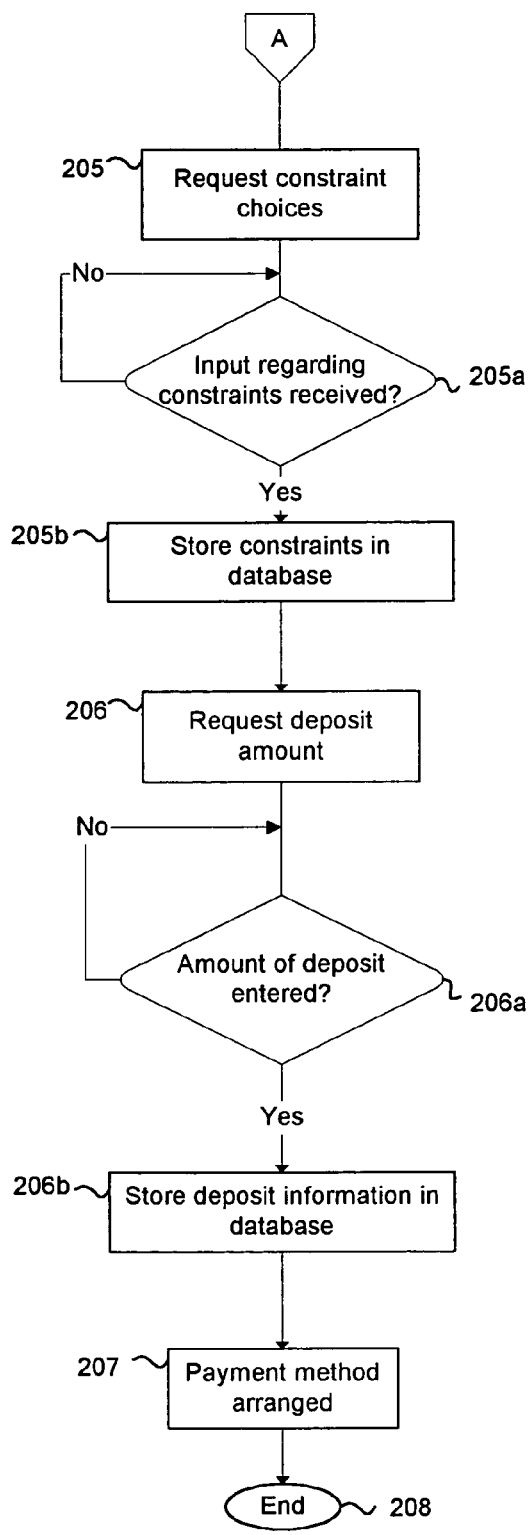

FIGS. 2a and 2b are a flow chart of the deposit process of an embodiment of the present invention. In step 201 a depositor 102 accesses the web site of a system 109 of a destination. Upon accessing, the universal server 111 in step 202 requests if the depositor 102 wants to make a deposit. If the depositor does not want to make a deposit the process is ended (step 202a) and the system may then be programmed to transfer him to a general information area for the destination. Alternatively, if the depositor does want to make a deposit, the universal server 111 in step 203 requests the depositor to input the personal information of the depositor 102. In step 203a, the system checks to determine if the personal information has been provided. In step 203b the personal information is stored in the database 112, once entered. When the previous process is completed the universal server 111 in step 204 requests the depositor 102 to choose from the list of destinations. In step 204a, the system checks whether one or more destinations have been chosen. In step 204b the destination choices are stored in the destination and constraint database 112.

In step 205 the universal server 111 requests the depositor 102 to choose the constraints or no constraints. In step 205a, the system checks whether the user has provided input regarding constraints. In step 205b any constraints selected are stored in the reference and constraint database 112. The amount of the deposit is then requested in step 206 and, once received (as confirmed in step 206a), is stored in the database in step 206b. Finally in step 207 payment is arranged, for example, a payment method is requested. Depending on the type of payment method then selected by the depositor 102, the universal server 111 would request additional billing information, for example, the input of a credit card account number and expiration date, or the routing number of a bank account. The deposit process is then ended in step 208.

Figure 3:
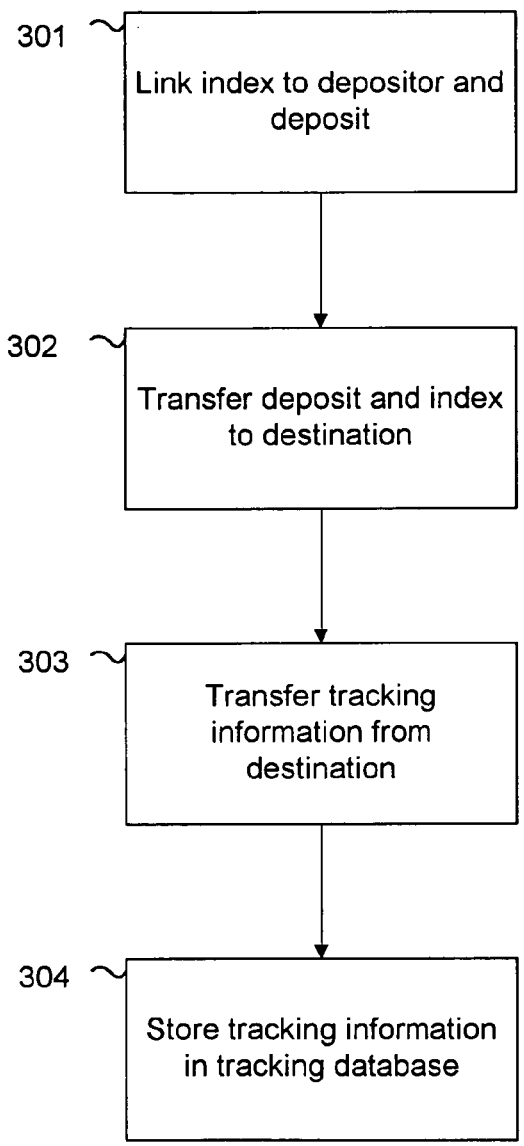
FIG. 3 is a block diagram depicting the tracking process according to an embodiment of the present invention.

FIG. 3 is a block diagram depicting the tracking process according to an embodiment of the present invention. In step 301 the deposit is linked with an index particular to the depositor 102. This information is stored in the tracking database 114. In step 302 the deposit, index and constraints are sent to the one or more initial destinations selected by the depositor 102. In step 303 the destinations transmit the tracking information back to the universal server 111. This information consists of uses of the deposit, further transfers of all or part of the deposit, and end products produced as a result of the use of the deposit. In step 304 this information is stored in the tracking database 114. The universal server 111 formats the tracking information and sorts it per index for later viewing by the depositor 102.

When all or part of the deposit is subjected to a transfer to a subsequent destination, the index is linked (or remains linked) to the deposit or portion thereof. Thus, steps 301 and 302 are carried out with respect to a subsequent destination. In addition, steps corresponding to steps 303 and 304 (transferring tracking information from the destination and storing it in the tracking database) are also performed for the subsequent destination. If there are other subsequent destinations, the same steps occur for each. If a subsequent destination in turn makes a transfer of all or part of the deposit to yet another subsequent destination or destinations, steps 301–304 are performed for each. Steps 301–304 are performed for successive levels of transfers to subsequent destinations.

When an end product is produced, a reference number is attached thereto. The reference number is stored in the reference database 116 where it is merged with the index and personal information of the depositor 102, subject to the disclosure level constraints. A third-party 132 accesses the universal server 111, enters in the reference number and views the depositor information of the reference database 116.

Effects of the deposit are also tracked in the same manner, and included in the tracking information. Effects include the results or consequences of using the deposit. Thus, in general, impacts of the deposit are tracked. Impacts include transfers of the deposit, using the deposit to purchase goods or services, transferring of the purchased goods, uses of the purchased goods, the effects of the services, the effects of the deposit, the effects of the goods, to name a few. The index is linked or associated with each use, transfer, effect or service. This linked information is sent back to the system for later viewing by the depositor or third party.

One example of an embodiment of the present invention follows. A depositor donates (deposits) $50.00 to a Boy Scout troop. The Boy Scouts use the money to purchase landscaping equipment in the form of rakes, clippers, hoes, etc. Information about the purchase of the equipment (a "use" type impact of the deposit) is linked with the index. The purchase of equipment is sent back to the system and stored, referenced by the index. The Boy Scouts subsequently use the brooms and rakes to clean up and landscape a run-down park. This use of the equipment to clean the park is an effect of the deposit. The index is thus associated with information about the clean-up effort, sent back to the system and stored, referenced by the index. As a result of this effort, the local government is able to use the newly cleaned park to host the Special Olympics. This use is a further effect of the deposit. The index is thus associated with information about the Special Olympics, sent back to the system and stored, referenced by the index. Subsequent effects may likewise be tracked, such as revenue raised as a result of hosting the Special Olympics, etc. By accessing the system via the Internet or by an impact statement sent to the depositor, the depositor can see the various uses, transfers and impacts of his or her initial donation.

Figure 4:
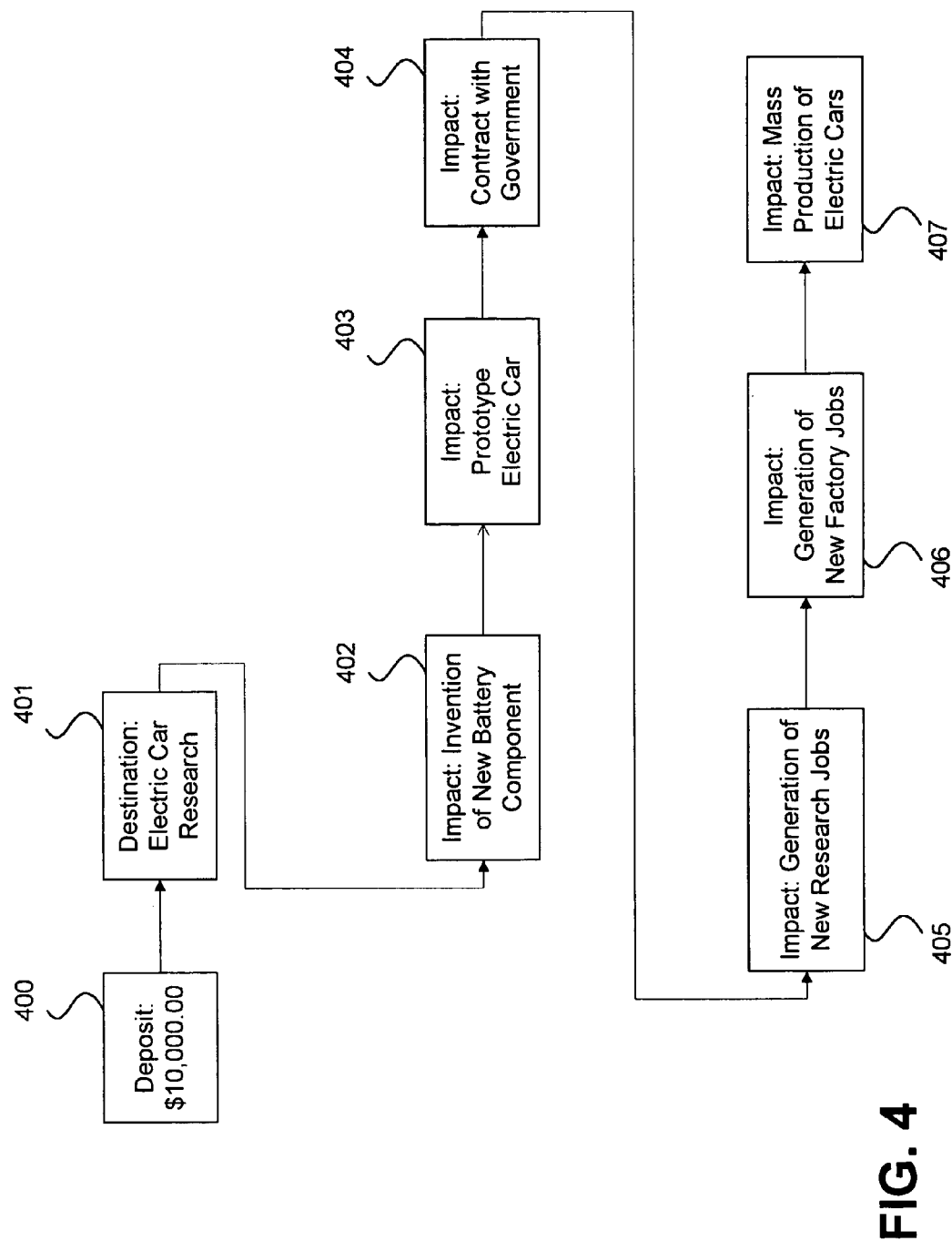
FIG. 4 is a block diagram depicting a specific example of an embodiment of the present invention.

FIG. 4 is a block diagram depicting a specific example of an embodiment of the present invention. A deposit of $10,000.00 is made by a depositor according to the procedure of FIG. 2, as represented in box 400. The destination of electric car research is displayed in box 401. In box 402 the research culminates in the development of a new type of car battery component. In box 403 the new battery component leads to the production of a prototype electric car. In box 404 the production of this car leads to a contract with the government. In box 405 the contract generates 100 new jobs in the research department. This, in turn, in box 406 leads to a generation of 1,000 new production jobs in the factories. All which eventually lead in box 407 to the mass production of electric cars.

In addition, information regarding the various impacts, including the use of the deposit for electric car research in box 401 and the subsequent levels of effects represented in boxes 402–407 are each associated with an index correlated to the depositor, and are transmitted and stored in a database. A reference number is placed on any new components, such as an electric car, which is associated with each such index that has contributed to its development. This enables a third-party 132 to access information about the depositors with deposits having an impact on the development of the product.

As another example, if the deposit created a new medicine, the system would track who benefited from the new medicine, how, when and where. If the medicine were used to create other medicines, that information would also be tracked. A reference number is placed on the bottle of the new medicine to be used by a third-party 132 and is correlated to all of the indices of deposits that had an impact on its development. Using the reference number, a third-party 132 can access information on the depositors that aided in the development of the new medicine.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of using a computing device for tracking a deposit, the deposit being made by a depositor, the method comprising the steps of:
    correlating an index to a depositor that makes the deposit;
    transferring at least a portion of the deposit and said index to one or more initial destinations;
    changing at least once the form of the deposit from a first form to a second form;
    transferring the index from the deposit in the first form to the deposit in the second form; and
    tracking one or more instances of impact of the deposit and portions thereof by correlating the index to any of said one or more instances of impact of the deposit and portions thereof,
    wherein the one or more instances of impact are unpredictable at the moment of deposit and include at least a use or effect of the deposit and portions thereof.

2. The method of claim 1, wherein an impact of the deposit or portion thereof includes one of a use, transfer or effect of the deposit or portion thereof.

3. The method of claim 1, wherein one or more impacts of the deposit are tracked from one or more initial destinations to one or more subsequent destinations.

4. The method of claim 1, wherein at least N impacts of the deposit are tracked to an Nth level of subsequent destinations, where N is an integer 2 or greater.

5. The method of claim 1, wherein an impact of the deposit is a use of at least a portion of the deposit by at least one initial destination, the index being correlated to the use.

6. The method of claim 1, wherein another impact of the deposit is an effect of the use of the at least a portion of the deposit, the index being correlated to the effect.

7. The method of claim 1, wherein an impact of the deposit comprises a transfer of at least a portion of the deposit to a first subsequent destination, the index being correlated to the transfer.

8. The method of claim 7, wherein a second impact of the deposit is a use of at least a portion of the deposit by the first subsequent destination, the index being correlated to the use.

9. The method of claim 8, wherein a third impact of the deposit is an effect of the use of the at least a portion of the deposit, the index being correlated to the effect.

10. The method in claim 1, further comprising the step of transmitting from the destination to the depositor a list of the one or more impacts.

11. The method in claim 10, wherein the list is transmitted to the depositor over at least one network connection.

12. The method in claim 10, wherein the depositor chooses the one or more initial destinations from a menu of destinations.

13. The method in claim 12, wherein the deposit is divided into two or more parts and the two or more parts are transferred with the index to two or more initial destinations.

14. The method in claim 1, wherein the depositor chooses one or more constraints for use of the deposit.

15. The method in claim 1, wherein the step of tracking one or more impacts of the deposit includes transmitting information regarding each impact and the correlated index to a central database, the information regarding each impact stored in the database and referenced by the index.

16. The method in claim 1, further comprising the steps of:
    correlating a reference to an impact of the deposit; and
    associating the index of the depositor with the reference.

17. The method in claim 16, further comprising the step of storing the reference and associated index in a database.

18. The method in claim 16, further comprising the step of identifying indices of other depositors having made deposits contributing to the impact and associating the indices of the other depositors with the reference.

19. The method in claim 18, further comprising the step of storing the reference and associated indices in a database.

20. The method in claim 18, further comprising the step of storing the reference and at least a portion of the depositor information corresponding to the associated indices in a database.

21. The method in claim 16, further comprising the step of storing the reference and at least a portion of the depositor information corresponding to the associated index in a database.

22. The method in claim 16, wherein the impact of the deposit is an end product.

23. The method in claim 22, further comprising the step of including the reference in the end product.

24. A deposit tracking method for a system having at least one processor and memory, the method comprising the steps of:
    receiving information regarding a depositor who has made a deposit,
    correlating an index particular to the depositor,
    storing the information regarding the depositor in memory, referenced by the index,
    transmitting the index for the depositor to one or more initial destinations of the deposit,
    receiving information regarding instances of impact of the deposit from destinations, the information including the index,
    changing at least once the form of the deposit from a first form to a second form;
    transferring the index from the deposit in the first form to the deposit in the second form; and
    storing the information regarding instances of impact in memory, referenced by the index,
    wherein the instances of impact are unpredictable at the moment of deposit and include at least a use or effect of the deposit.

25. The deposit tracking method as in claim 24, wherein the system generates a list of impacts of the deposit by using the index to retrieve from memory the impact information pertaining to the deposit.

26. The deposit tracking method as in claim 24, wherein the processor receives the one or more initial destinations from input provided by the depositor.

27. The deposit tracking method as in claim 24, wherein the processor apportions the deposit into two or more parts, correlates the index to each part, and initiates a transfer of the two or more parts of the deposit and the index to two or more destinations.

28. The deposit tracking method as in claim 24, wherein the processor receives one or more constraints for use of the deposit from input received from the depositor.

29. A deposit tracking system, comprising:
    a processor configured to receive information regarding an impact of a deposit at a destination and an index number; the processor further configured to change at least once the form of the deposit from a first form to a second form and transferring the index number from the deposit in the first form to the deposit in the second form, and further wherein the processor is configured to initiate a transmission of the impact information and the index number to a central database for storage,
wherein the impact information is unpredictable at the moment of deposit and includes information related to at least a use or effect of the deposit.

30. The deposit tracking system as in claim 29, wherein the processor is part of a destination that receives an impact of a donation and the information regarding the impact of a deposit is input to the processor by personnel associated with the destination.

31. The deposit tracking system as in claim 30, wherein the information regarding the impact of a deposit pertains to the impact of the donation received at the destination.

32. The deposit tracking system as in claim 30, wherein the information regarding the impact of a deposit pertains to an impact of the donation received at a subsequent destination.

33. The deposit tracking system as in claim 29, wherein the impact information is referenced in the central database by the index.

34. The deposit tracking system as in claim 29, wherein the impact of the deposit at the destination is a use of at least a portion of the deposit at the destination.

35. The deposit tracking system as in claim 29, wherein the impact of the deposit at the destination is a transfer of at least a portion of the deposit from the destination to one or more subsequent destinations.

36. The deposit tracking system as in claim 29, wherein the impact of the deposit at the destination is an effect of a prior impact of the deposit.

37. A method of using a computing device for tracking a deposit, the method comprising the steps of:
generating tracking information for said deposit by
creating a database record for a received deposit, said database record including an identity of a depositor of said received deposit and a description of said deposit and assigning an index number to said database record;
changing at least once the form of the deposit from a first form to a second form;
transferring the index number from the deposit in the first form to the deposit in the second form;
updating said generated database record with updated tracking information, said updated tracking information including at least one of the following:
an initial or subsequent apportionment of at least a portion of said deposit,
an initial or subsequent destination of at least a portion of said deposit,
an initial or subsequent use of at least a portion of said deposit, and
an initial or subsequent impact of at least a portion of said deposit, wherein said impact is unpredictable at the moment of deposit; and
accessing said generated database record, wherein said access being at least partially limited by constraints defined by said depositor, said constraints including at least one of the following:
a time limit for limiting tracking of said deposit,
a destination depth for limiting tracking of said deposit to a number of subsequent transfers of at least a portion of said deposit, and
disclosure constraints for limiting tracking of said deposit to information that may be accessed.

38. A method as in claim 37, wherein said impact of said deposit comprises at least one of the following:
the purchase of a good or a service, and
the transfer of a good or a service.

39. A method as in claim 38, wherein said generated database record includes a reference number corresponding to each said purchase or transfer of a good.

40. A method as in claim 37, further comprising viewing said generated database record.

41. A method as in claim 40, wherein said generated database record may be viewed by at least one of the following:
said depositor, and a third party.

42. A method as in claim 40, wherein said generated database record is viewable over the Internet.

43. A method as in claim 37, wherein said deposit is a donation.

44. A method as in claim 37, wherein said database record is updated using tracking information received from at least one destination.

45. A system for tracking a deposit, comprising:
a computer; and
software code for performing the following:
generating tracking information for said deposit, comprising:
generating a database record for a received deposit, said database record
including the identity of the depositor of said received deposit and a description of said deposit, and
assigning an index number to said database record,
changing at least once the form of the deposit from a first form to a second form,
transferring the index number from the deposit in the first form to the deposit in the second form,
updating said generated database record with updated tracking information, said updated tracking information including information about at least one of the following:
an initial or subsequent apportionment of at least a portion of said deposit,
an initial or subsequent destination of at least a portion of said deposit,
a initial or subsequent use of at least a portion of said deposit, and
an initial or subsequent impact of at least a portion of said deposit, wherein said impact is unpredictable at the moment of deposit; and
accessing said generated database record, said access being at least partially limited by constraints defined by said depositor, said constraints including at least one of the following:
a time limit for limiting tracking of said deposit,
a destination depth for limiting tracking of said deposit to a number of subsequent transfers of at least a portion of said deposit, and
disclosure constraints for limiting tracking of said deposit to information that may be accessed.

46. A system as in claim 45, wherein said impact of said deposit comprises at least one of the following:
the purchase of a good or a service, and
the transfer of a good or a service.

47. A system as in claim 46, wherein said generated database record includes a reference number corresponding to each said purchase or transfer of a good.

48. A system as in claim 45, further comprising software code for viewing said generated database record.

49. A system as in claim 48, wherein said generated database record may be viewed by at least one of the following:
said depositor, and a third party.

50. A system as in claim 48, wherein said generated database record is viewable over the Internet.

51. A system as in claim 45, wherein said deposit is a donation.

52. A system as in claim 45, wherein said database record is updated using tracking information received from at least one destination.

53. A method as in claim 45, wherein said generated database record may be identified, selected, or searched using at least one of the following:
said identity of said depositor;
said description of said deposit;
said deposit index number; and
a reference number, wherein said reference number corresponds to a purchase or transfer of a good, said reference number being included in said generated database record.

54. A system as in claim 45, further comprising software for identifying, selecting, or searching said generated database record using at least one of the following:
said identity of said depositor;
said description of said deposit;
said deposit index number; and
a reference number, wherein said reference number corresponds to a purchase or transfer of a good, said reference number being included in said generated database record.

* * * * *